United States Patent
Bloch et al.

[11] Patent Number: 6,124,032
[45] Date of Patent: Sep. 26, 2000

[54] PRESSURE SENSITIVE HEAT ACTIVATED FILMIC ADHESIVE TAPE

[76] Inventors: Gilbert Bloch, 3349 S. Malo Ct., Palm Beach Gardens, Fla. 33410; Gerald Bloch, 21 E. 87th St., New York, N.Y. 10128; Arnold B Finestone, 2400 Presidential Way, West Palm Beach, Fla. 33401

[21] Appl. No.: 09/007,893

[22] Filed: Jan. 15, 1998

[51] Int. Cl.$^7$ .................... B32B 7/12; B32B 7/10
[52] U.S. Cl. ............... 428/346; 428/349; 428/354; 428/355 EN
[58] Field of Search ............ 428/354, 355 EN, 428/349, 346

[56] References Cited

U.S. PATENT DOCUMENTS

| | | | |
|---|---|---|---|
| 2,631,947 | 3/1953 | Kline et al. | 442/150 |
| 4,059,715 | 11/1977 | Pletcher | 525/377 |
| 4,139,675 | 2/1979 | Nagai et al. | 430/60 |
| 4,199,646 | 4/1980 | Hori et al. | 428/344 |
| 4,325,770 | 4/1982 | Korpman | 156/230 |
| 4,545,843 | 10/1985 | Bray | 156/322 |
| 4,880,683 | 11/1989 | Stow | 428/200 |
| 4,937,111 | 6/1990 | Fontanilla | 428/34.1 |
| 4,980,222 | 12/1990 | Rivera et al. | 428/195 |
| 5,006,396 | 4/1991 | VanBortel et al. | 428/189 |
| 5,190,798 | 3/1993 | Bloch | 525/326.3 |
| 5,238,183 | 8/1993 | Sauerwine | 229/304 |
| 5,246,762 | 9/1993 | Nakamura | 428/172 |
| 5,298,708 | 3/1994 | Babu et al. | 219/728 |
| 5,376,419 | 12/1994 | Foster et al. | 428/40 |
| 5,390,472 | 2/1995 | Weiler et al. | 53/412 |
| 5,491,018 | 2/1996 | Maro et al. | 428/200 |
| 5,496,601 | 3/1996 | Schurb | 428/40 |
| 5,518,799 | 5/1996 | Finestone et al. | 428/137 |
| 5,565,252 | 10/1996 | Finestone et al. | 428/40.9 |
| 5,589,246 | 12/1996 | Calhoun et al. | 428/120 |
| 5,599,621 | 2/1997 | Akhter | 428/349 |
| 5,637,368 | 6/1997 | Cadalbert et al. | 428/40.1 |
| 5,670,015 | 9/1997 | Finestone et al. | 156/549 |
| 5,686,180 | 11/1997 | Rivlin et al. | 428/350 |
| 5,780,150 | 7/1998 | Bloch et al. | 428/350 |
| 5,786,064 | 7/1998 | Finestone et al. | 428/137 |
| 5,804,024 | 9/1998 | Bloch et al. | 156/272.6 |
| 5,908,694 | 6/1999 | Makar et al. | 428/349 |
| 5,942,299 | 8/1999 | Tynan, Jr. et al. | 428/40.1 |

OTHER PUBLICATIONS

Brochure from Central Products Company, 2 pages, Description and picture of "Central Brand Water–Activated Carton Sealer".

Brochure from Intertape Polymer Group Distribution Products, 1 page, Description and picture of "UA 262020–4 Uniform Automatic Carton Sealer".

Brochure from Belcor Industries Inc., 2 pages, Description and picture of "BEl 252—Fully Automatic Uniform Case Taper".

Brochure from LOVESHAW, an ITw Company, Little David Products Division, 2 pages, Description and picture of "Model Ld–16A, Fully automatic Uniform Pressure Sensitive Taper".

Brochure for 3M Company, 2 pages, description and picture of "3M–Matic™ 800af Automatic Adjustable Case Sealer".

*Primary Examiner*—Yogendra Gupta
*Assistant Examiner*—Christine Ingersoll
*Attorney, Agent, or Firm*—Pennie & Edmonds LLP

[57] ABSTRACT

A heat-activated sealing tape for manufacturing or sealing a carton or other article. The tape is composed of a paper layer, a layer formed of oriented plastic film which is adhesively laminated to the paper layer, and a heat-activatable adhesive exposed for use in adhering the paper-plastic film laminate to an object. The heat activatable adhesive is inactive at ambient temperatures. When exposed to low temperature heat sealing conditions, the adhesive is activated and enables the tape to be adhered to the article to be sealed. The sealing tape is designed for ease of handling and reduction in waste, and is adaptable for use in existing automatic and semi-automatic equipment for manufacturing or sealing cartons.

11 Claims, 1 Drawing Sheet

PRESSURE SENSITIVE HEAT ACTIVATED FILMIC ADHESIVE TAPE

FIELD OF INVENTION

This invention relates generally to tapes for sealing cartons, packages and other articles, and more particularly to a paper-plastic film laminate tape capable of being adhered to a carton or other article with a heat-activated pressure sensitive adhesive.

BACKGROUND

Adhesive tapes for sealing cartons are well known in the art. Three general types of tapes are typically used: paper tape, glass-reinforced water-activated tape, and pressure-sensitive tape. The different characteristics of these tapes make them suitable for certain uses but inadequate for others.

Paper tape is generally manufactured using a water-activated starch or animal-based adhesive thereon which is moistened immediately before the tape is applied to an article. This grade of water-activated adhesive tape is inexpensive, can be printed or marked, and lends itself to recycling, but it does not provide sufficient strength needed for certain applications. For example, when paper tape is used to seal and hold together a carton, the tape will tear or split when encountering torque forces.

Glass-reinforced water-activated tape typically has two plies of Kraft paper, laminated together by a hot melt polymeric adhesive, and sandwiched between the plies are lengthwise oriented or superposed arrays of fiberglass strands. The use of fiberglass strands makes the tape capable of withstanding much higher stresses and loading, but this kind of tape is significantly more expensive than simple paper tape. In addition, the laminated paper tape is relatively thick, given that it has the fiberglass strands sandwiched between its plies, so that the limited yardage in a roll of this tape gives rise to practical problems. For example, when the tape dispenser is in uninterrupted use in carton sealing operations, the tape roll is quickly exhausted, thereby making it necessary to frequently change the tape rolls.

Also, the hot melt polymeric adhesive used in glass-reinforced tape is not compatible with recycling operations, because the adhesive cannot be separated easily from the materials that are fed into the recycling equipment. Hence a standard, fiberglass-reinforced paper tape, when used to seal an otherwise recyclable article, usually renders it non-recyclable, unless the tape is first removed. Stripping the tape off, however, is a time-consuming and difficult process, for the gummed face of the tape is securely joined to the article, and if one attempts to strip this tape from the article, a residue of hot melt adhesive remains thereon and renders it unsuitable for recycling. In addition, when the tape is removed from the carton, it usually removes some of the corrugated paper as well, thus making it difficult to reuse the carton.

Furthermore, because the hot melt adhesive in the tape tends to build up on the cutting blade of the dispenser, it is necessary from time to time to shut down the dispenser to clean this blade.

The use of hot melt adhesive also has drawbacks in the manufacture of reinforced tapes in a conventional laminator. In manufacturing, two Kraft paper webs are continuously fed into the laminator, the surface of one web having been previously covered with a coating of hot melt adhesive. The hot melt adhesive must be maintained in a heated state while the laminator is in operation. Because this hot, flowable adhesive tends to drip over the operating mechanism of the laminator, it becomes necessary from time to time to shut down the laminator and use solvents to clean it. The use of volatile solvents may lead to adverse health and environmental effects, as well as additional costs in the process of recovering or disposing of the solvents. Also, as hot melt adhesives are sensitive to temperature changes, operation during cold temperature months can lead to partial cooling of the adhesive before application to the carton, with a weaker adhesive bond being achieved as a result.

A hot melt adhesive is one type of heat activatable adhesive. This type of adhesive is characterized as being inert and non-tacky at room temperature to facilitate handling of the tape, and is activated to a tacky or sticky state when heated to elevated temperatures. For example, U.S. Pat. No. 4,545,843 applies a heat activatable adhesive film to a porous substrate by heating the film and substrate to a temperature of between 200° F. and 500° F. to join the two together and form a laminate. A pressure sensitive adhesive is then applied to the film to provide an adhesive tape. Although the film in that patent is not used to adhere the substrate to a carton or similar object, the patent is cited as an illustration of the temperatures required to activate the adhesive. This type of adhesive is typically activated by heating 50° C. above the Tg of the polymer in the adhesive, as shown in U.S. Pat. No. 4,880,683.

Pressure-sensitive tape is a another kind of tape commonly used by consumers and in commercial and industrial operations in which cartons and other articles are packed and sealed. The adhesives used for pressure-sensitive tapes are primarily hot melt adhesives that become pressure sensitive when coated upon a latex such as an acrylate. When a user cuts a strip of pressure-sensitive adhesive tape from a roll dispenser, this strip remains in a usable condition for an indefinite period, for however long the pressure-sensitive adhesive is exposed to the atmosphere, it continues to be sticky and the strip can be applied to a carton.

Unlike pressure-sensitive tape, a tape that is coated instead with a remoistenable adhesive, such as starch, must first be moistened with water. The water-moistened adhesive is then active for a limited "open-time," i.e., a limited time period during which the adhesive remains in a moistened state and in a condition to be applied to a carton or other article. With typical paper based sealing tape having a remoistenable adhesive coating on the paper, the open-time is from about 10 to 30 seconds, the more aggressive adhesives having shorter open-times. If the adhesive dries before the tape is applied to a box or carton, the tape is rendered inoperative and useless.

Problems with short open-times are avoided when pressure-sensitive adhesive tape is used, since pressure-sensitive adhesive remains sticky indefinitely. However, there are drawbacks to the stickiness, which results in handling problems when the tape twists, sticks to itself and thus renders long lengths of tape useless. In manual operation, such problems with pressure-sensitive tape result in undesirable waste and lowered efficiency.

Thus, a need exists for a tape that is strong, does not weaken when wet, does not require the use of solvents, is capable of being stripped from a carton in the same manner as standard room-temperature pressure sensitive tape, and unwinds freely without sticking to itself the way pressure-sensitive tape does. Such a tape should also be adaptable for use on existing automatic and semi-automatic machinery for packing and sealing cartons with only minor modifications of the equipment.

SUMMARY OF THE INVENTION

The primary object of this invention is to provide a pressure sensitive heat activated sealing tape for sealing a carton or other article, the tape being coated on an exposed surface of the article by a water dispersion of polyethylene copolymer that becomes pressure sensitive and seals when exposed to low temperature heating.

More particularly, an object of this invention is to provide a tape of the above type that is designed for ease of handling and reduction in waste, and is adaptable for use in existing automatic and semi-automatic equipment for packing and sealing cartons.

More specifically, an object of the invention is to provide a tape of the above type in which a base ply of oriented, synthetic plastic film, whose opposing surfaces are treated to render them wettable and receptive to adhesives, is laminated by a water-based non-remoistenable adhesive to a face ply of paper, the exposed wettable surface of the base ply having a coating thereon of a water dispersion of polyethylene copolymer, so that the dispersion, when treated to low temperature heating, is activated and enables the tape to be adhered to the article to be sealed.

The tape of the invention preferably comprises a paper layer; a layer of a plastic film having first and second surfaces, and which is oriented to increase its strength, the first surface being adhesively laminated to the paper layer to form a paper-plastic film laminate; and a heat-activatable pressure sensitive adhesive exposed for use in adhering the paper-plastic film laminate to an object, the heat activatable adhesive being inactive at ambient temperatures but activated upon exposure to a temperature which is less than that which will significantly deteriorate the strength of the oriented plastic film.

Advantageously, the adhesive comprises one or more polyethylene copolymers and is activated at temperatures between 100° F. and 200° F., and preferably between about 105° F. and 180° F. In a more preferred embodiment, the adhesive comprises an emulsion of the polyethylene copolymer and is activated at temperatures of between about 120° F. and 165° F.

If desired, the adhesive can include an additive to enhance adhesion, such as a polyimine polymer or a polyvinyl acetate copolymer.

The first surface of the plastic film is corona discharge treated before lamination to the paper layer. This is preferably accomplished using a water-based adhesive, typically one which includes an acrylic copolymer or a polyvinyl acetate copolymer. Also, the thermally activatable adhesive is applied to the second surface of the plastic film after a corona discharge treatment of that surface. Advantageously, the water-based adhesive is applied to the plastic film of the laminate before the paper layer is cold laminated to the adhesive containing plastic film.

BRIEF DESCRIPTION OF THE DRAWINGS

For a better understanding of the invention as well as other objects and further features thereof, reference is made to the following detailed description to be read in conjunction with the accompanying drawings, wherein.

DETAILED DESCRIPTION OF THE INVENTION

Figure 1:
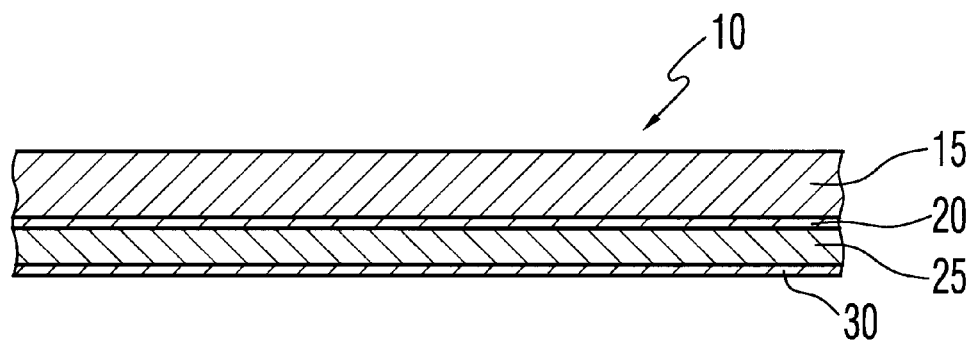
FIG. 1 is a cross section taken through a sealing tape in accordance with the invention, the thickness of whose plies is exaggerated.
Figure 2:
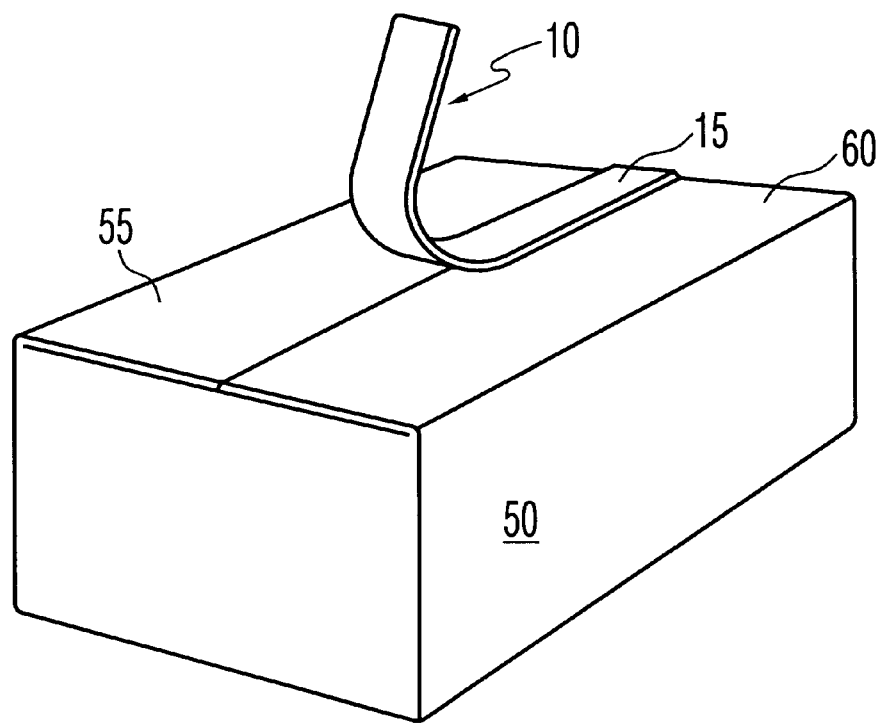
FIG. 2 shows a carton sealed with the tape.

Referring now to FIGS. 1 and 2, a sealing tape 10 in accordance with the invention includes a face ply 15 formed of Kraft or other paper sheeting. Face ply 15 is cold laminated by an adhesive layer 20 to a base ply 25 of high-strength, oriented, synthetic plastic film, such as polyethylene. Preferably, the film is formed of a oriented or biaxially-oriented material, such as polypropylene or polyester (MYLAR). The opposing film surfaces of the base ply are rendered wettable by corona discharge treatment so that they are receptive to heat activated pressure sensitive adhesives.

Coated on the exposed wettable surface of base ply 25 is a heat activated pressure sensitive adhesive 30, so that the sealing tape can be adhered to a carton, a package or other article. The adhesive is initially inactive, but when heated to higher temperatures becomes activated to close the flaps of the carton or to carry out any other conventional sealing functions. This type of adhesive has a controlled "open time" during which the pressure sensitive heat activated adhesive is operable. While the open time can be controlled by the selection of the type of polymer in the adhesive, it is also possible to reduce the time that the adhesive is operable by activating the adhesive just prior to application to the carton or article without curling and while avoiding sticking during transport and handling.

The plastic film base ply 25 nominally does not exceed about two mils in thickness; hence, by itself, it lacks rigidity and body. The Kraft paper face ply 15 is thicker, preferably being 2 or 3 mils thick, but no greater than 5 mils thereby imparting a measure of stiffness and body to the tape.

When film ply 25 is oriented, it has exceptional tensile strength, such orientation being effected by stretching the film along both its transverse and horizontal axes to molecularly orient the structure of the film. The strength of the paper face ply 15 alone is not high, but the paper-film laminate has both body and high strength.

Cold lamination of the plies is effected by a water-based adhesive, preferably a polyacrylic copolymer composition having an affinity both for the paper ply and the film ply. Because the water-based adhesive is fluid at ambient temperature and is not a hot melt adhesive, no heat is applied to the oriented film as it is being laminated to the paper ply. By water-based adhesive is meant an adhesive which when cured cannot thereafter be reactivated by water. Also useable is a polyvinyl acetate copolymer.

It is important to bear in mind that an oriented film is heat-sensitive and that at elevated temperatures, the film relaxes and loses its molecular orientation and strength. It is known, for example, that when two sheets of biaxially-oriented polyester film are seamed together, using an ultrasonically-activated sealing bar for this purpose which creates internal friction, and heat within the film and causes the superposed films to soften and fuse, the resultant sealing line is weak, and the sheets then tend to tear along this line. Cold lamination is, therefore, essential to the present invention in order to produce a tape laminate of high strength.

The adhesive coating 30 which can be applied to the exposed surface of plastic film 25 or paper layer 15, is a water based heat seal coating composition, preferably a dispersion that is based on ethylene interpolymers. The coating must have good block resistance and be capable of pressure sensitive heat sealing after heating.

In order to optimize use of the heat activated pressure sensitive tape, the dispersion coating has a heat activation range that falls within acceptable temperature limits; i.e., preferably about 105° F. to 180° F., and most preferably between about 120° F. and 165° F. If the activation range is too low, such as approximately 100° F., then the adhesive coating could be activated when a roll of the tape is stored in a hot location, such as a vehicle or warehouse on a hot day. Once the adhesive on such a roll of tape is activated, it sticks permanently the tape roll, which becomes unusable. On the other hand, if the dispersion is not activated until the temperature is very high, such as above 225° F., then the heat required to activate the adhesive coating could adversely affect the strength of the oriented plastic film layer or cause it to delaminate or peel back from the paper layer.

In order to obtain a polyethylene copolymer coating that is activated at temperatures in the preferred heat activation range, it is preferable to use a copolymer that has a medium molecular weight or to mix a high molecular weight copolymer with a lower molecular weight copolymer. The resulting mixture tends to melt faster, i.e., be activated at lower temperatures than a dispersion of high molecular weight copolymer alone. One of ordinary skill in the art can determine by routine testing the molecular weights of the copolymer or copolymers which provide the desired activatable temperature range of the adhesive to be used for particular applications.

In addition, it may be desirable to mix the polyethylene dispersion with a polyimine or polyvinylacetate copolymer latex in order to enhance the adhesiveness of the coating so that it will stick more readily to the exposed plastic film surface of the tape or the substrate.

It is to be noted that a synthetic plastic film material, such as polypropylene, is normally not receptive to adhesives, especially water-based adhesives. Hence if one were to apply to the surface of this film a water-based adhesive or dispersion which is flowable at ambient temperature or at a temperature somewhat above ambient but not at the elevated temperature of a hot melt adhesive, the adhesive will not be adsorbed by the film. Essential to the invention is that the opposing surfaces of the film forming the base ply of the tape be treated so as to render them wettable and hence receptive to adhesives and to the copolymer dispersion. To this end, these surfaces are subjected to a corona discharge treatment which enhances their surface energy, as measured in dynes, and thereby renders them wettable to allow for better bonding of adhesives applied thereto.

The tape of the invention can be successfully applied to cartons or other objects utilizing conventional automatic or semi-automatic machines in place of pressure sensitive or water-moistenable tape. Of course, these machines require the addition of a heat bar to activate the tape prior to application of the tape to the article. For water-moistenable tape machines, the water reservoir and brush application can be removed, as well, since it is not necessary. On semiautomatic machines, these small modifications are much less than the cost of the machines, so that the tape of the present invention can be used at about the same cost as prior art tapes. In addition, the problem of pressure sensitive tape sticking and water-moistened tape drying out is avoided. As the heat activator bar can be placed relatively close to the package, the adhesive becomes activated immediately before application to the carton or package to avoid these prior art difficulties.

The preferred heat activatable pressure sensitive adhesive is a water dispersion of a mixture of polyethylene and polyethylene copolymers having a solids content of between 50% to 60%. The actual mixture will vary based on the desired activation temperature range and open time. This dispersion is applied to the paper or corona discharge-treated plastic film, is then dried and the dried tape is collected on a roll. As these polymers are non-blocking in that they do not adhere to adjacent layers in the roll before activation, similar to water-moistenable tape before contact with water. Typically, an amount of about 8 to 30 pounds of the adhesive per square yard of paper is deposited prior to drying.

The Kraft paper face ply 15, which is formed of cellulosic fibers, is permeable and therefore receptive to printing and writing. Because of this, one may print on the paper face ply such notices a FRAGILE or HANDLE WITH CARE, or one may write with a marker pen on the tape. In practice, a colored paper ply may be used to render the tape more attractive. One may apply to the tape stick-on labels or adhere a second sealing tape thereover to further reinforce the seal. This would not be possible with a sealing tape whose exposed surface is that of a synthetic plastic film.

As mentioned above, conventional tape application equipment can be used to apply the tape of the invention. This equipment is simply modified by the addition of a heating bar which the tape moves by to activate the adhesive prior to application of the tape to the carton. The temperature of the bar is selected to be sufficiently high to soften the polymer of the adhesive but not too high to affect the orientation or strength of the plastic film. The tape is maintained in spaced relation to the heating bar with the adhesive coated side of the tape facing the bar. This prevents the activated adhesive of the tape from contamination the bar. The location of this bar is selected to be sufficiently close or far to the article to be sealed depending upon the open time of the adhesive and the type of sealing that is to be made.

For corrugated cardboard box formation, a flat sheet of corrugated box board cut to size and scored is automatically fed into a box-forming machine which has been adapted with an automatic pressure sensitive heat activated tape sealing machine of the type previously described. The four sides of the box are shaped and the open side seam is closed with pressure sensitive heat activated tape automatically, with half the width of the tape on one side of the seam and half on the other side of the seam. This four sided box can be delivered before folding and sealing the four bottom and four top flaps.

For closure of such boxes, an automatic box forming machine is adapted with a pressure sensitive heat activated tape sealing machine of the type previously described. First, the four bottom flaps are folded and passed over the tape whose claw then seals the two outermost bottom flaps with tape to form an L-closure on two side walls. After the box is filled, the four top flaps are closed with the two outermost flaps being closed and sealed in the same manner as the bottom flaps.

FIG. 2 shows a corrugated board carton 50 after being filled with products and now in condition for sealing. This box 50 has complementary top flaps 55 and 60 which are folded and sealed by the paper-film laminate tape 10 in accordance with the invention. To this end, the heat activatable adhesive coating on the tape is activated by passing by the heating bar so that the tape bridging the edges of the flaps can be adhered thereto to seal the carton. For this type of sealing operation, a shorter open time is desirable, since both flaps are closed simultaneously rather than separately as with box formation.

When tape 10 is so applied to the flaps, its paper face ply 15 is exposed. The surface of this ply is printable; hence if the carton contains articles made of glass, a FRAGILE GLASS notice may be stamped or printed onto the tape.

While the carton may in the course of shipment be exposed to rain or snow, and this will wet the paper face ply.

As the strength of the tape is largely determined by the strength of the plastic film base ply, the tape will not be weakened by water even though its paper ply becomes wet.

What is claimed is:

1. A heat-activatable tape comprising:

a paper layer;

a layer of a plastic film having first and second surfaces, and which is oriented to increase its strength, the first surface adhesively cold laminated to the paper layer to form a paper-plastic film laminate; and a heat-activatable pressure sensitive adhesive comprising a non-blocking polymer for adhering the paper-plastic film laminate to an object after being heat-activated, the heat activatable adhesive being inactive at ambient temperatures but activated upon exposure to a temperature which is less than that which will significantly deteriorate the strength of the oriented plastic film.

2. The tape of claim 1 wherein the adhesive is activated at temperatures between 100° F. and 200° F.

3. The tape of claim 1 wherein the adhesive comprises a polyethylene copolymer and is activated at temperatures between about 105° F. and 180° F.

4. The tape of claim 3 wherein the adhesive comprises an emulsion of the polyethylene copolymer and is activated at temperatures of between about 120° F. and 165° F.

5. The tape of claim 3 wherein the adhesive comprises an additive to enhance adhesion.

6. The tape of claim 5 wherein the adhesion enhancing additive comprises a polyimine polymer or a polyvinyl acetate copolymer.

7. The tape of claim 1 wherein the first surface of the plastic film is corona discharge treated before lamination to the paper layer.

8. The tape of claim 1 wherein the plastic film is laminated to the paper layer with a water-based adhesive.

9. The tape of claim 8 wherein the water-based adhesive includes an acrylic copolymer or a polyvinyl acetate copolymer.

10. The tape of claim 1 wherein the thermally activatable adhesive is applied to the second surface of the plastic film after a corona discharge treatment of that surface.

11. The tape of claim 1 wherein the thermally activated adhesive is applied to the paper layer.

* * * * *